(12) United States Patent
Hastings et al.

(10) Patent No.: US 12,417,400 B2
(45) Date of Patent: Sep. 16, 2025

(54) FAULT TOLERANT HASTINGS-HAAH CODES IN THE PRESENCE OF DEAD QUBITS

(71) Applicant: Microsoft Technology Licensing, LLC, Redmond, WA (US)

(72) Inventors: Matthew Benjamin Hastings, Seattle, WA (US); Parsa Bonderson, Santa Barbara, CA (US); Zhenghan Wang, Goleta, CA (US); Jeongwan Haah, Bellevue, WA (US); David Alexander Aasen, Santa Barbara, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 285 days.

(21) Appl. No.: 18/332,004

(22) Filed: Jun. 9, 2023

(65) Prior Publication Data

US 2024/0412092 A1    Dec. 12, 2024

(51) Int. Cl.
*G06N 10/00*    (2022.01)
*G06N 10/70*    (2022.01)

(52) U.S. Cl.
CPC .................................. *G06N 10/70* (2022.01)

(58) Field of Classification Search
None
See application file for complete search history.

(56) References Cited

U.S. PATENT DOCUMENTS

| | | | |
|---|---|---|---|
| 2021/0194507 A1* | 6/2021 | Delfosse | G06N 10/70 |
| 2021/0334688 A1* | 10/2021 | Delfosse | G06N 10/40 |
| 2024/0354629 A1* | 10/2024 | Hastings | G06N 10/70 |

* cited by examiner

*Primary Examiner* — Anh Q Tran
(74) *Attorney, Agent, or Firm* — Cantor Colburn LLP; Stephen A. Wight

(57) ABSTRACT

Aspects of the disclosure include removing a faulty qubit in a quantum circuit. The faulty qubit is determined to be in the quantum circuit, the faulty qubit being associated with a plaquette having other qubits, where adjacent plaquettes are neighboring the plaquette. A route is determined to isolate the plaquette from the adjacent plaquettes. Measurements are caused to be performed on the quantum circuit for the route that isolates the plaquette having the faulty qubit and the other qubits.

20 Claims, 12 Drawing Sheets

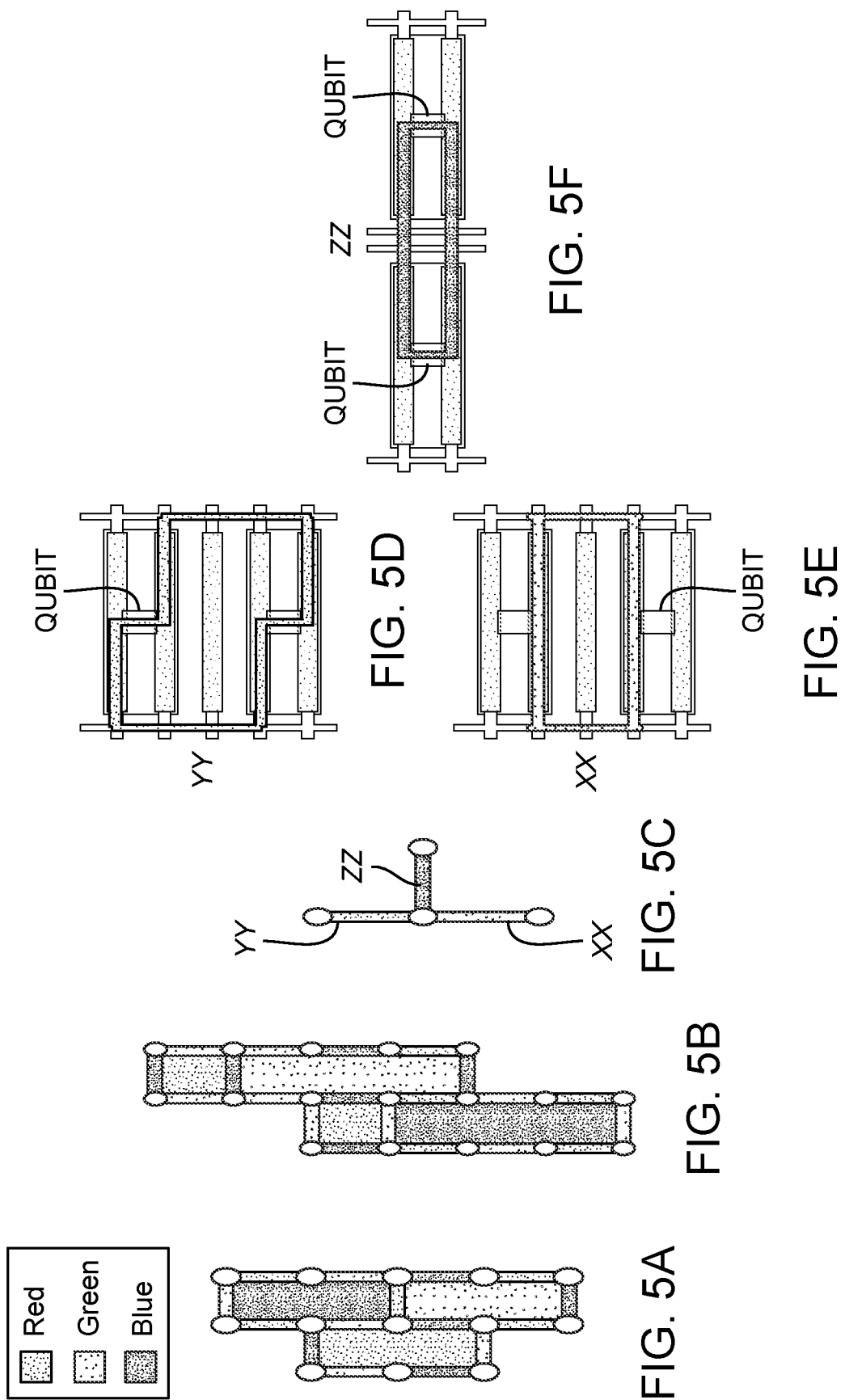

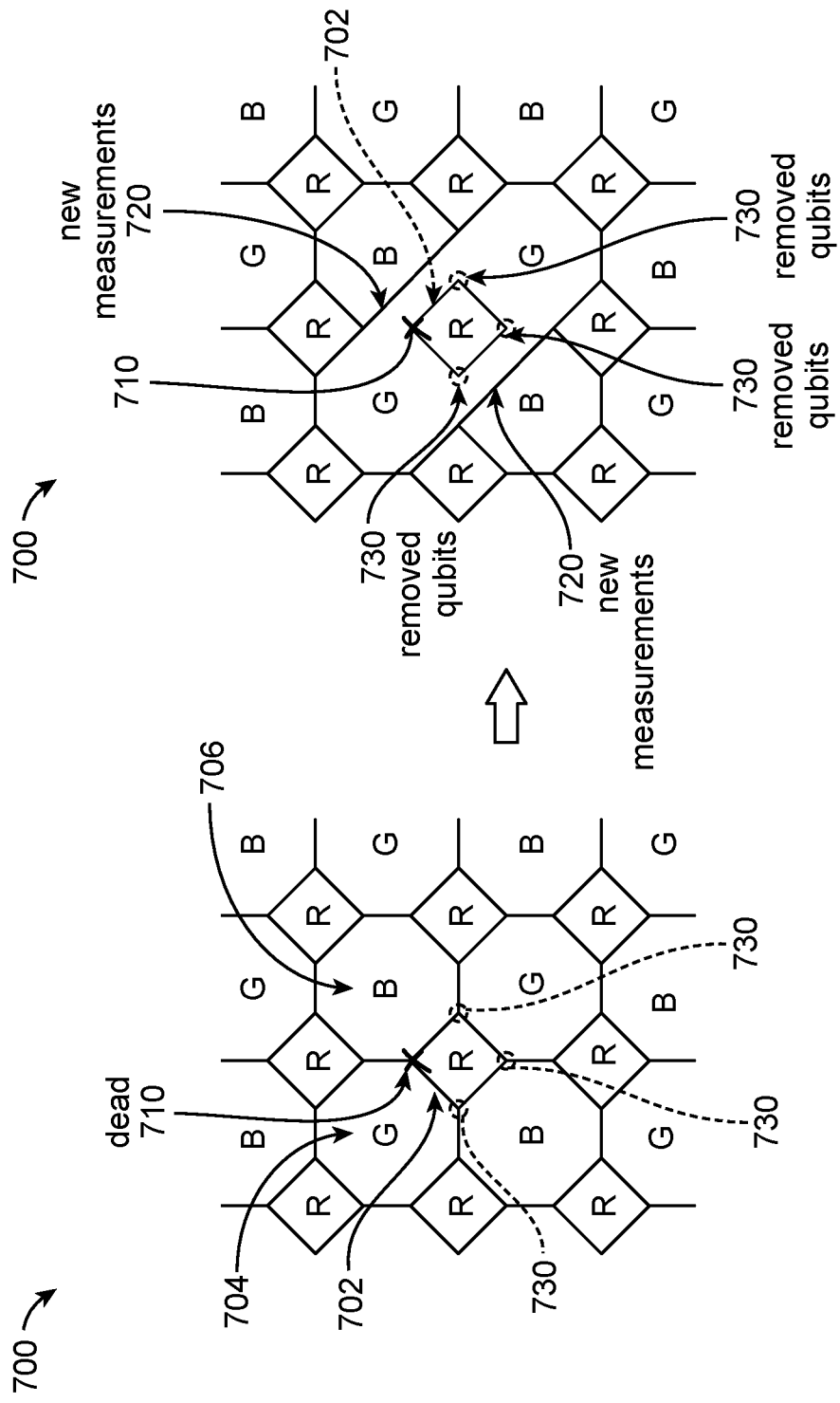

DETERMINE THE FAULTY QUBIT IN THE QUANTUM CIRCUIT, THE FAULTY QUBIT BEING ASSOCIATED WITH A PLAQUETTE HAVING OTHER QUBITS, WHEREIN ADJACENT PLAQUETTES ARE NEIGHBORING THE PLAQUETTE 902

DETERMINE A ROUTE TO ISOLATE THE PLAQUETTE FROM THE ADJACENT PLAQUETTES 904

CAUSE MEASUREMENTS TO BE PERFORMED ON THE QUANTUM CIRCUIT FOR THE ROUTE THAT ISOLATES THE PLAQUETTE HAVING THE FAULTY QUBIT AND THE OTHER QUBITS 906

FAULT TOLERANT HASTINGS-HAAH CODES IN THE PRESENCE OF DEAD QUBITS

INTRODUCTION

The subject disclosure relates to quantum circuits, and particularly to fault tolerant Hastings-Haah codes in the presence of dead qubits.

A quantum computer is a physical machine configured to execute logical operations based on or influenced by quantum-mechanical phenomena. Such logical operations may include, for example, mathematical computation. Current interest in quantum-computer technology is motivated by analysis suggesting that the computational efficiency of an appropriately configured quantum computer may surpass that of any practicable non-quantum computer when applied to certain types of problems. Such problems include computer modeling of natural and synthetic quantum systems, integer factorization, data searching, and function optimization as applied to systems of linear equations and machine learning. Furthermore, it has been predicted that continued miniaturization of conventional computer logic structures will ultimately lead to the development of nanoscale logic components that exhibit quantum effects and should therefore be addressed according to quantum-computing principles.

Different types of quantum computers base their operation on different quantum-mechanical phenomena. A "topological" quantum computer is a quantum computer whose operation is based on a non-Abelian topological phase of matter that may support "braidable" quasiparticles. This type of quantum computer is expected to be less prone to the issue of quantum decoherence than other types of quantum computers, and may therefore serve as a relatively fault-tolerant quantum-computing platform.

SUMMARY

Embodiments of the present invention are directed to methods for providing fault tolerant Hastings-Haah codes in the presence of dead qubits. A non-limiting example method for removing a faulty qubit in a quantum circuit includes determining the faulty qubit in the quantum circuit, the faulty qubit being associated with a plaquette having other qubits, where adjacent plaquettes are neighboring the plaquette. The method includes determining a route to isolate the plaquette from the adjacent plaquettes, and causing measurements to be performed on the quantum circuit for the route that isolates the plaquette having the faulty qubit and the other qubits.

Embodiments of the present invention are directed to a system for providing fault tolerant Hastings-Haah codes in the presence of dead qubits. A non-limiting example system includes a memory, computer readable instructions, and a processor for executing the computer readable instructions. The computer readable instructions control the processor to perform operations including determining a faulty qubit in a quantum circuit, the faulty qubit being associated with a plaquette having other qubits, where adjacent plaquettes are neighboring the plaquette. The processor performs operations including determining a route to isolate the plaquette from the adjacent plaquettes and causing measurements to be performed on the quantum circuit for the route that isolates the plaquette having the faulty qubit and the other qubits.

Another non-limiting example system includes a quantum circuit, and a computer coupled to the quantum circuit and comprising a processor controlled to perform operations. The processor performs operations including determining the faulty qubit in the quantum circuit, the faulty qubit being associated with a plaquette having other qubits, where adjacent plaquettes are neighboring the plaquette. The processor performs determining a route to isolate the plaquette from the adjacent plaquettes. The processor performs causing measurements to be performed on the quantum circuit for the route that isolates the plaquette having the faulty qubit and the other qubits.

The above features and advantages, and other features and advantages of the disclosure are readily apparent from the following detailed description when taken in connection with the accompanying drawings. This Summary is provided to introduce in simplified form a selection of concepts that are further described in the Detailed Description. This Summary is not intended to identify key features or essential features of the claimed subject matter, nor is it intended to be used to limit the scope of the claimed subject matter. The claimed subject matter is not limited to implementations that solve any or all disadvantages noted in any part of this disclosure.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 5A depicts a vertical brick wall unit of a honeycomb lattice in accordance with one or more embodiments;

FIG. 5B depicts a vertical brick wall unit of the 4.8.8 lattice in accordance with one or more embodiments;

FIG. 5C depicts the directions for XX, YY, and ZZ measurements in accordance with one or more embodiments;

FIG. 5D depicts example bulk YY measurements in accordance with one or more embodiments;

FIG. 5E depicts example bulk XX measurements in accordance with one or more embodiments;

FIG. 5F depicts example bulk ZZ measurements in accordance with one or more embodiments;

FIG. 7A depicts a plaquette 3-colorable lattice of the 4.8.8 code with a dead qubit in accordance with one or more embodiments;

FIG. 7B depicts the plaquette 3-colorable lattice of the 4.8.8 code after recoupling to remove the dead qubit and with new measurements in accordance with one or more embodiments;

FIG. 9 is a flowchart of a computer-implemented method for removing a faulty qubit in a quantum circuit in accordance with one or more embodiments;

The diagrams depicted herein are illustrative. There can be many variations to the diagram or the operations described therein without departing from the spirit of the invention. For instance, the actions can be performed in a differing order or actions can be added, deleted or modified.

In the accompanying figures and following detailed description of the described embodiments of the invention, the various elements illustrated in the figures are provided with two or three-digit reference numbers. With minor exceptions, the leftmost digit(s) of each reference number corresponds to the figure in which its element is first illustrated.

DETAILED DESCRIPTION

In accordance with one or more embodiments, a system, method, and/or classical computer are configured and arranged to provide fault tolerant Hastings-Haah codes in the presence of dead qubits, for use on a quantum computer. A dead qubit is a faulty physical qubit that no longer functions as intended. There can be various reasons for the dead qubit to stop functioning as intended, which could be in the physical structure of the dead qubit, the connections to the dead qubit, etc. The terms dead qubit, faulty qubit, broken qubits, etc. can be utilized interchangeably to refer to a physical qubit that has an error in its functioning. The problem of dead qubits has to be addressed in any implementation of a quantum computer. One or more embodiments describe strategies for addressing the problem of dead qubits in the Hastings-Haah (HH) code. In accordance with one or more embodiments, a strategy is to design a new measurement schedule that is fault tolerant and does not involve the faulty components by using the Hastings-Haah code. The various strategies discussed herein for addressing a dead qubit are designed to measure local logical operators that would normally be present but for the faulty components being in the hardware of the faulty qubit and/or associated with the faulty qubit. In accordance with one or more embodiments, a solution is to utilize recoupling that can be applied to any code running on a plaquette 3-colorable lattice. One or more embodiments are directed to a single faulty qubit, and then a design is created for a measurement sequence that excludes the faulty qubit and/or does not have support on the faulty qubit. The disclosure further discusses how this can be generalized to address a plurality of faulty qubits.

Quantum computing can utilize methods that suppress errors in faulty qubits. Quantum error correction is a broad class of techniques that encode "logical" qubits and gates in a subspace of the Hilbert space formed by many more "physical" qubits and gates. The structure of a quantum code has an influence on how logical gates are enacted on the physical qubits, and hence the total size and execution time of a quantum computation.

Figure 1:
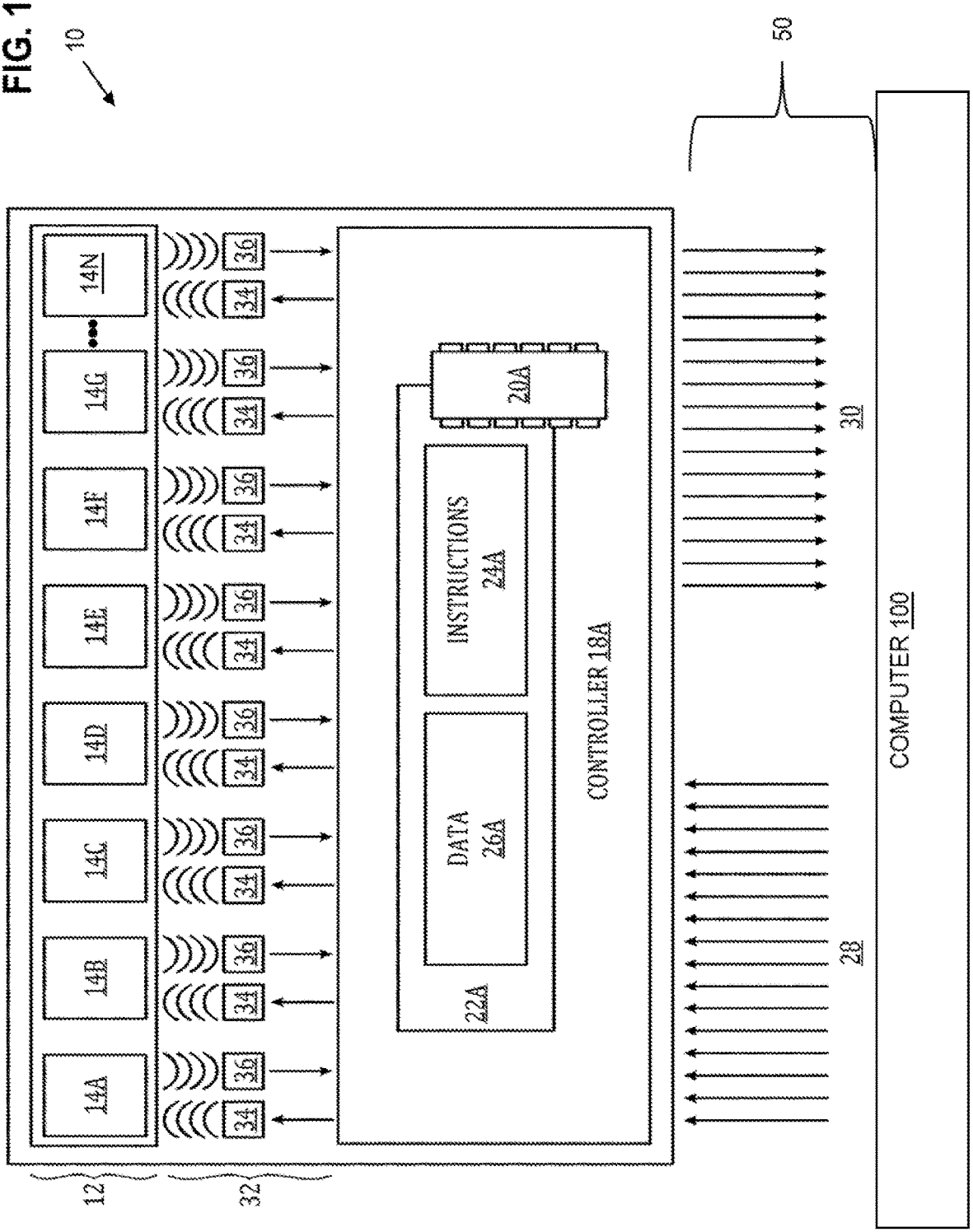
FIG. 1 depicts an example quantum computer configured to execute quantum-logic operations in accordance with one or more embodiments.
Figure 4:
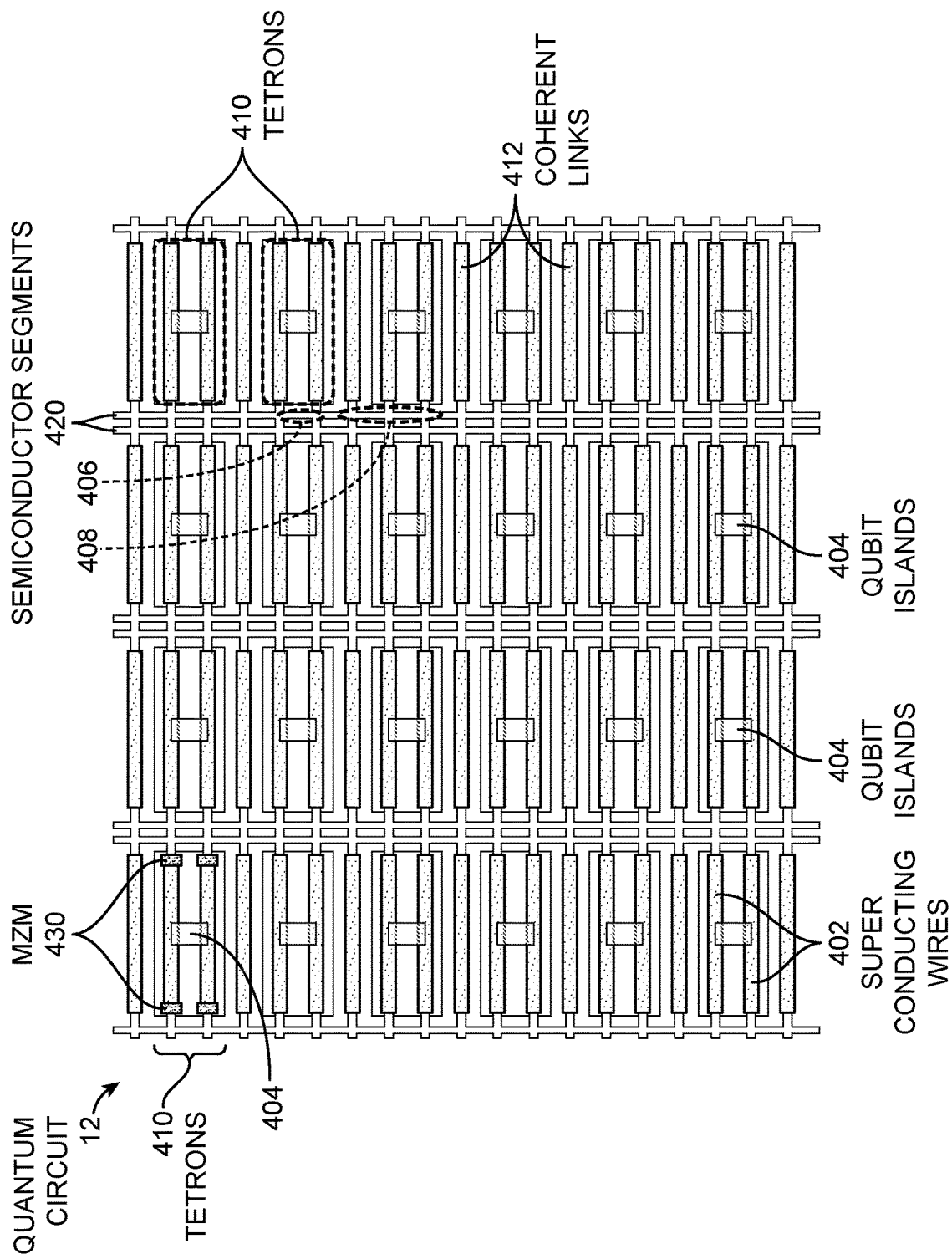
FIG. 4 depicts a layout of a quantum circuit in accordance with one or more embodiments.

Example Quantum Computer Architecture: FIG. 1 illustrates an example quantum computer 10 configured to execute quantum-logic operations. While conventional computer memory holds digital data in an array of bits and enacts bit-wise logic operations, a quantum computer holds data in an array of qubits and operates quantum-mechanically on the qubits in order to implement the desired logic. Accordingly, quantum computer 10 of FIG. 1 includes at least one quantum circuit 12 having an array of physical qubits 14A, 14B, and 14C-14N, where N is the last number of qubits. The qubits 14A-14N can be referred to collectively as qubits 14. The quantum circuit 12 of the array of qubits 14 can be arranged in a lattice structure as depicted in FIG. 4.

The qubits 14 of the quantum circuit 12 take various forms, depending on the desired architecture of the quantum computer 10. While this disclosure relates to qubits embodied as quasiparticles in a non-Abelian topological phase, a qubit alternatively can include: a superconducting Josephson junction, a trapped ion, a trapped atom coupled to a high-finesse cavity, an atom or molecule confined within a fullerene, an ion or neutral dopant atom confined within a host lattice, a quantum dot exhibiting discrete spatial- or spin-electronic states, electron holes in semiconductor junctions entrained via an electrostatic trap, a coupled quantum-wire pair, an atomic nucleus addressable by magnetic resonance, a free electron in helium, a molecular magnet, or a metal-like carbon nanosphere, as non-limiting examples. More generally, each qubit 14 can include any particle or system of particles that can exist in two or more discrete quantum states that can be measured and manipulated experimentally. For instance, a qubit may be implemented in the plural processing states corresponding to different modes of light propagation through linear optical elements (e.g., mirrors, beam splitters and phase shifters), as well as in states accumulated within a Bose-Einstein condensate.

Figure 2:
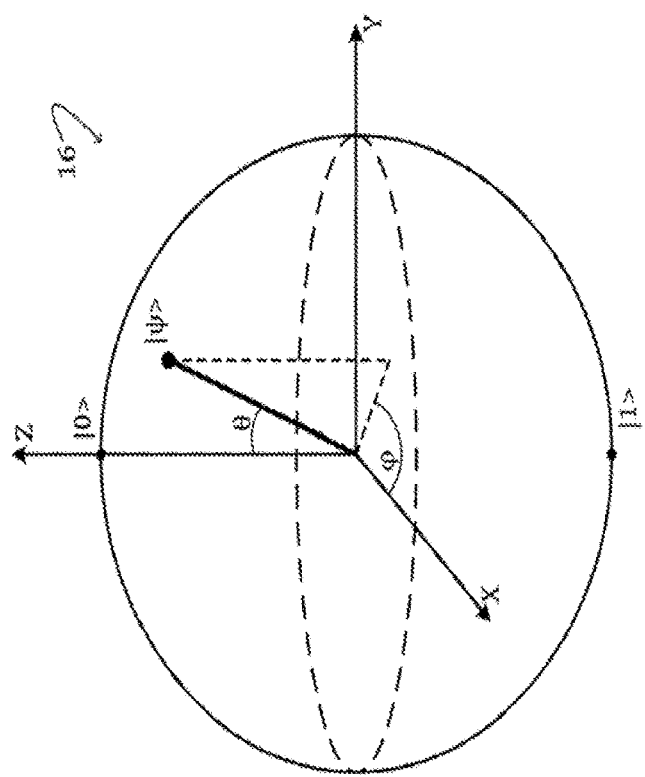
FIG. 2 depicts an illustration of a Bloch sphere that provides a graphical description of some quantum mechanical aspects of an individual qubit in accordance with one or more embodiments.

FIG. 2 is an illustration of a Bloch sphere 16 that provides a graphical description of some quantum mechanical aspects of an individual qubit 14. In this description, the north and south poles of the Bloch sphere correspond to the standard basis vectors |0> and |1>, respectively. The set of points on the surface of the Bloch sphere comprise all possible pure states |ψ> of the qubit, while the interior points correspond to all possible mixed states. A mixed state of a given qubit may result from decoherence, which may occur because of undesirable coupling to external degrees of freedom.

Referring to FIG. 1, quantum computer 10 includes a controller 18A. The controller 18A includes at least one processor 20A and associated computer memory 22A. The processor 20A of the controller 18A can be coupled operatively to peripheral componentry, such as network componentry, to enable the quantum computer to be operated remotely. The processor 20A of the controller 18A can take the form of a central processing unit (CPU), a graphics processing unit (GPU), or the like. As such, the controller can include classical electronic componentry. The terms "classical" and "non-quantum" are applied herein to any component that can be modeled accurately as an ensemble of particles without considering the quantum state of any individual particle. Classical electronic components include integrated, micro-lithographed transistors, resistors, and capacitors, for example. The computer memory 22A can be configured to hold program instructions 24A that cause the processor 20A to execute any function or process of the controller. The computer memory can also be configured to hold additional data 26A. In examples in which quantum circuit 12 is a low-temperature or cryogenic device, the controller 18A can include control componentry operable at low or cryogenic temperatures, for example, a field-programmable gate array (FPGA) operated at 77 kelvin (K). In such examples, the low-temperature control componentry can be coupled operatively to interface componentry operable at normal temperatures.

The controller 18A of the quantum computer 10 is configured to receive a plurality of inputs 28 and to provide a plurality of outputs 30 to classical computer 100. The inputs and outputs can each include digital and/or analog lines in a network 50. At least some of the inputs and outputs can be data lines through which data is provided to and/or extracted from the quantum computer. Other inputs can include control lines via which the operation of the quantum computer can be adjusted or otherwise controlled. In one or more embodiments, the quantum computer 10 can be coupled to a classical computer 100. Further, details of the example computer 100 are discussed in FIG. 13.

The controller 18A is operatively coupled to the quantum circuit 12 via quantum interface 32. The quantum interface 32 is configured to exchange data bidirectionally with the controller 18A. The quantum interface 32 is further configured to exchange signal corresponding to the data bidirectionally with the qubit register. Depending on the architecture of quantum computer 10, such signal may include electrical, magnetic, and/or optical signal. By the signal conveyed through the quantum interface 32, the controller 18A can interrogate and otherwise influence the quantum state held in various qubits 14. For example, the controller 18A can interrogate and otherwise influence the quantum state held a qubit register, as defined by a collective quantum state of a group of qubits 14. The quantum interface 32 includes at least one modulator 34 and at least one demodulator 36, each coupled operatively to one or more qubits 14 of the quantum circuit 12. In one or more embodiments, a modulator 34 and a demodulator 36 can each be coupled to qubits in a qubit register. Each modulator 34 is configured to output a signal to one or more qubits 14 in the quantum circuit 12 based on modulation data received from the controller 18A. In one or more embodiments, at least one modulator 34 can output a signal to qubits in a qubit register based on modulation data received from the controller 18A. Each demodulator 36 is configured to sense a signal from the one or more qubits 14 of the quantum circuit 12 and to output data to the controller 18A based on the signal. In one or more embodiments, each demodulator 36 is configured to sense a signal from the qubit register and to output data to the controller 18A based on the signal. The data received from the demodulator 36 can, in some examples, be an estimate of an observable to the measurement of the quantum state held in one or more qubits 14 in the quantum circuit 12. In one or more embodiments, the data received from the demodulator 36 can be an estimate of an observable to the measurement of the quantum state held in the qubit register.

In some examples, the modulator 34 can transmit a suitably configured signal to interact physically with one or more qubits 14 of the quantum circuit 12 in order to trigger measurement of the quantum state held in one or more qubits 14. The demodulator 36 can then sense a resulting signal released by the one or more qubits 14 pursuant to the measurement and can provide the data corresponding to the resulting signal to the controller 18A. Stated another way, the demodulator 26 is configured to output, based on the signal received, an estimate of one or more observables reflecting the quantum state of one or more qubits of the qubit register, and to furnish the estimate to the controller 18A. In one non-limiting example, the modulator 34 can provide, based on data from the controller 18A, an appropriate voltage pulse or pulse train to an electrode of one or more qubits 14, to initiate a measurement. In short order, the demodulator 36 can sense photon emission from the one or more qubits 14 and can assert a corresponding digital voltage level on a quantum-interface line into the controller 18A. Generally speaking, any measurement of a quantum-mechanical state is defined by the operator "O" corresponding to the observable to be measured; the result "R" of the measurement is guaranteed to be one of the allowed eigenvalues of "O". In the quantum computer 10, "R" is statistically related to the qubit-register state prior to the measurement but is not uniquely determined by the qubit-register state.

Pursuant to appropriate input from the controller 18A, the quantum interface 32 may be configured to implement one or more quantum-logic gates to operate on the quantum state held in the quantum circuit 12, for example, in a qubit register in the quantum circuit 12. While the function of each type of logic gate of a classical computer system is described according to a corresponding truth table, the function of each type of quantum gate is described by a corresponding operator matrix. The operator matrix operates on (i.e., multiplies) the complex vector representing the qubit register state and effects a specified rotation of that vector in Hilbert space.

For example, the Hadamard gate HAD is defined by $$HAD = \frac{1}{\sqrt{2}}\begin{bmatrix} 1 & 1 \\ 1 & -1 \end{bmatrix}. \quad (1)$$

The HAD gate acts on a single qubit; it maps the basis state |0> to (|0>)/√2, and maps to |1> to (|0>−|1>) √2. Accordingly, the HAD gate creates a superposition of states that, when measured, have equal probability of revealing |0> or | 1>.

The phase gate S is defined by $$S = \begin{bmatrix} 1 & 0 \\ 0 & e^{i\pi/2} \end{bmatrix}. \quad (2)$$

The S gate leaves the basis state |0> unchanged but maps |1> to $e^{i\pi/2}$|1>. Accordingly, the probability of measuring either |0> or |1> is unchanged by this gate, but the phase of the quantum state of the qubit is shifted. This is equivalent to rotating ψ by 90 degrees along a circle of latitude on the Bloch sphere of FIG. 2.

Some quantum gates operate on two or more qubits. The SWAP gate, for example, acts on two distinct qubits and swaps their values. This gate is defined by $$SWAP = \begin{bmatrix} 1000 \\ 1010 \\ 0100 \\ 0001 \end{bmatrix}. \quad (3)$$

The foregoing list of quantum gates and associated operator matrices is non-exhaustive, but is provided for ease of illustration. Other quantum gates include Pauli-X, -Y, and -Z gates, the $\sqrt{NOT}$ gate, additional phase-shift gates, the $\sqrt{SWAP}$ gate, controlled cX, cY, and cZ gates, and the Toffoli, Fredkin, Ising, and Deutsch gates, as non-limiting examples.

Figure 3:
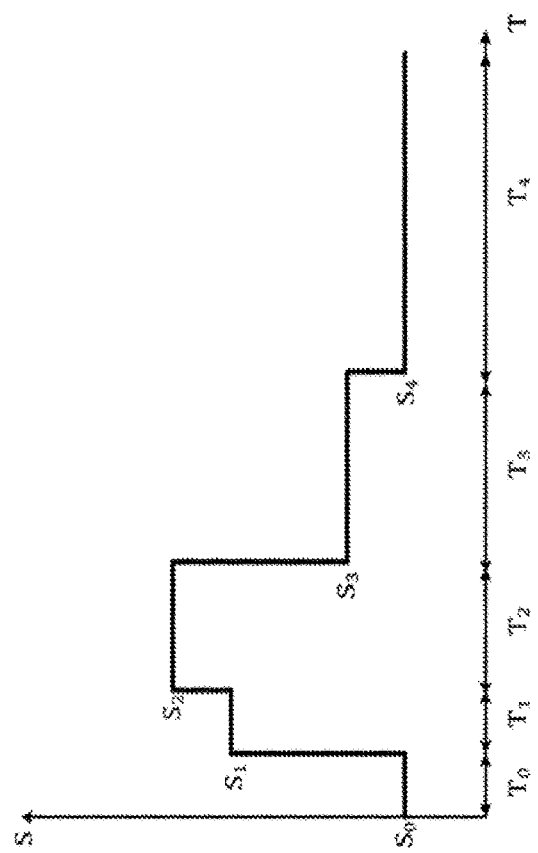
FIG. 3 is a graph of example signal levels associated durations to assert a quantum-gate operation on one or more qubits of a quantum circuit in accordance with one or more embodiments.

Continuing in FIG. 1, suitably configured signal from modulators 34 of the quantum interface 32 can interact physically with one or more qubits 14 of the quantum circuit 12, for example, a qubit register in the quantum circuit 12, so as to assert any desired quantum-gate operation. As noted above, the desired quantum-gate operations are specifically defined rotations of a complex vector representing the qubit register state. In order to effect a desired rotation "O", one or more modulators of quantum interface 32 can apply a predetermined signal level Si for a predetermined duration Ti. In some examples, plural signal levels can be applied for plural sequenced or otherwise associated durations, as depicted in FIG. 3, to assert a quantum-gate operation on one or more qubits of the quantum circuit 12, for example, in a qubit register of the quantum circuit 12. In general, each signal level Si and each duration Ti is a control parameter adjustable by appropriate programming of controller 18A.

The term 'oracle' is used herein to describe a predetermined sequence of elementary quantum-gate and/or measurement operations executable by quantum computer 10. An oracle can be used to transform the quantum state of qubits 14 in the quantum circuit 12, for example, qubits in a qubit register, to effect a classical or non-elementary quantum-gate operation or to apply a density operator, for example. In some examples, an oracle may be used to enact a predefined 'black-box' operation f(x), which may be incorporated in a complex sequence of operations. To ensure adjoint operation, an oracle mapping n input qubits |x> to m output or ancilla qubits |y>f(x) may be defined as a quantum gate O(|x>⊗|y>) operating on the n+m qubits. In this case, O can be configured to pass the n input qubits unchanged but combine the result of the operation f(x) with the ancillary qubits via an XOR operation, such that O(|x>⊗t>)=x>⊗|y+f(x)>. As described further below, a state-preparation oracle is an oracle configured to generate a quantum state of specified qubit length.

Implicit in the description herein is that each qubit 14 of qubit registers can be interrogated via quantum interface 32 so as to reveal with confidence the standard basis vector |0> or |1> that characterizes the quantum state of that qubit. In some implementations, however, measurement of the quantum state of a physical qubit could be subject to error. Accordingly, any physical qubit 14 can be implemented as a logical qubit, which includes a grouping of physical qubits measured according to an error-correcting oracle that reveals the quantum state of the logical qubit with confidence.

Topological Quantum Computer: In a topological quantum computer, the quantum state held in each qubit is a state of two or more braidable quasiparticles, or "anyons", observed within a non-Abelian topological phase of matter. The world lines of different anyons are quantum mechanically forbidden from intersecting or merging. This feature forces their paths to form stable braids that pass around each other in space-time. Relative to trapped particles used in other types of quantum computers, anyon braids are more resistant to quantum decoherence, which is a source of error in quantum computation. However, the realization of a topological quantum computer has the ability to engineer a suitable topological phase and to manipulate the anyons therein.

Early experiments in topological quantum computing focused on the two-dimensional 'electron gas' of a supercooled, thin layer of gallium arsenide (GaAs) sandwiched between layers of aluminum gallium arsenide (AlGaAs) and manipulated in a strong magnetic field. Implementation of a quantum computer using that architecture includes the braiding of individual quasiparticle excitations combined with anyonic interferometry-based measurement, involving coherent quasiparticle transport over significant distances.

Proposed more recently is a one-dimensional topological qubit architecture that is more amenable to practical implementation. The proposed system uses a semiconductor-superconductor heterostructure wherein superconductivity, strong spin-orbit coupling, and magnetic fields cooperate to form a topological, superconducting state that supports Majorana zero modes (MZMs). This architecture obviates the need to move quasiparticles by employing a "measurement-only" method wherein a sequence of measurements has the same effect as a braiding operation. This architecture does not require quasiparticles to be moved through an interferometry loop, but rather exploits a distinction between a "fermion parity-protected topological phase" (the actual genus of the proposed heterostructure) and a true topological phase. Advantageously, topological charge in a fermion parity-protected topological phase can be manipulated by the process of electron tunneling into a MZM. Transport through a pair of MZMs can provide a measurement of their combined topological charge in the presence of a large charging energy.

In view of these and other useful properties, MZMs can be used as a basis for the qubits of a topological quantum computer. The MZMs are created at the ends of semiconductor-superconductor heterostructures tuned into a topological regime by the appropriate magnetic field and gate voltages. A series of practical implementations are described in Karzig et al., *Scalable Designs for Quasiparticle-Poisoning-Protected Topological Quantum Computation with Majorana Zero Modes*, arXiv: 1610.05289v4 [cond-mat.mes-hall] 21 Jun. 2017. Suitable heterostructure materials and material properties are described in Lutchyn et al., *Majorana Fermions and a Topological Phase Transition in Semiconductor-Superconductor Heterostructures*, arXiv: 1002.4033v2 [cond-mat.supr-con] 13 Aug. 2010. The entirety of both of the above references is hereby incorporated by reference herein, for all purposes.

Example implementations include at least two topological superconducting segments in a qubit, totaling at least four Majorana zero modes per qubit. The states used for quantum computation is the degenerate ground states of the qubit, in contrast to non-degenerate quantum-computing architectures where the two states of the qubit have different energies. The degeneracy of the qubit states and the spatial separation of the Majorana zero modes ensure long coherence times and feasibility of precise application of a set of Clifford gates.

FIG. 4 illustrates an example layout of a square lattice of tetrons used to implement a honeycomb and 4.8.8 Floquet codes. In FIG. 4, topological superconducting wires 402 have a MZM at both ends. Qubit islands 404 correspond to two parallel topological superconducting wires 402 joined by a trivial superconducting backbone, with MZMs 430 labeled according to the box in the upper left. MZMs 430 are illustrated for a single tetron 410 but applies to all of the tetrons 410. Rows of tetrons 410 are separated by coherent links 412, which are floating topological wires. Neighboring qubit islands 404 are connected by semiconducting segments 420, with two semiconducting columns of semiconducting segments 420 separating each column of qubit islands 404. There are also rows of semiconductor regions connected the semiconductor segments 420 to coherent links 412 and superconducting wire 402. The coherent links 412 do not have the qubit islands 404. The superconducting wires 402 connect to qubit islands 404, which are the physical qubits 14 in the quantum circuit 12. Since the physical qubits 14 are arranged in an array, the qubit islands 404 are in columns. A semiconductor segment 406 can be referred to as length-1 semiconductor quantum dot with gate defined. A semiconductor segment 408 can be referred to as length-2 semiconductor quantum dot with gate defined.

Each tetron 410 in FIG. 4 includes a physical qubit, where the qubit islands 404 are the physical qubits 14. The tetron 410, which encompasses a qubit island 404, can be referred to as a physical qubit. In the example square lattice as at least a portion of the quantum circuit 12, there is an array of 6*4=24 tetrons displayed, each representing a physical qubit. As seen in FIG. 4, the MZM 430 appears at the end of each topological superconducting wire 402. A quartet of MZMs 430 forms a logical qubit, where each tetron 410 has two topological superconducting wires 402, and each wire has two MZMs 430. Altogether each tetron 410 has 4 MZMs which includes one physical qubit, for example, physical quit 14.

Dead qubits can present a problem for a code that runs as the instructions to cause measurements on the quantum circuit. It may appear that one could simply run the error correcting code as usual and account for dead qubits in post-processing, but this would be unlikely. It is assumed that there is some finite density of dead qubits, with a typical distance $\ell$ between them. With some probability that is exponentially suppressed in $≥$, this scenario creates an undetectable local logical operator whose end points are localized to a pair of dead qubits distance $≥$ apart. The probability of this occurrence is exponentially small in $≥$, but it is not suppressed in system of a larger size, and once this happens, it could be difficult detect. As one continues running the code, at a later time, another logical operator can be created on a different pair of dead qubits, and so on until the system is full of undetectable errors; error correction may be untenable in such as situation. Further, one may not worry that a lot of defects are created in one round, as that would be suppressed in system size, L, but rather one may worry that a typical scenario will be one in which the operation creates one (or more) pair of undetectable local logical operators in each round over a large number of rounds.

As noted herein, one or more embodiments are configured and arranged to provide fault tolerant Hastings-Haah codes in the presence of dead qubits, for use on a quantum computer that returns the results observables to the measurement of the quantum state. It is likely that one can learn of a dead qubit during the calibration stage of the quantum circuit. In some cases, one may not detect the dead qubits during calibration, or some qubits die after calibration. In such a case, one or more embodiments can detect that a qubit is dead from postprocessing. The measurement outcomes for all pairwise measurements at the boundary of any given plaquette are highly correlated as discussed further in FIGS. 12A, 12B, and 12C. A detection cell in the Hastings-Haah code on the hexagon lattice consists of twelve measurement outcomes, and in the absence of error, the detection cell will not change value, for example, the detection cell is the mod 2 value of the sum of those 12 measurements. In accordance with one or more embodiments, a dead qubit involved in a detection cell likely results in a random result for the detection cell at each round. The disclosure gathers statistics on all detection cells over many rounds and assume unreliable detection cells contain one or more dead qubits in their support. A detection cell is a plaquette that is supported by the dead qubit. According to one or more embodiments, three neighboring detection cells triangulate a single dead qubit, four neighboring detection cells triangulate a pair of dead qubits, and so on. Accordingly, dead qubits can be triangulated purely with detection cells in accordance with one or more embodiments.

The Hastings-Haah code is measurement code for logical qubits, and the measurements are performed using plaquettes. The Hastings-Haah code is based on a honeycomb lattice. As noted herein, the instructions 24A cause measurements on the quantum circuit 12 using the modulators 34 and demodulators 36. A measurement of one or more physical qubits 14 is the result of sending a signal via the modulator 34 and receiving a signal back via the demodulator 36. The received signal, also referred to as the measurements, has the quantum information about the logical qubit that is formed of two or more physical qubits 14. Based on a signal sent and the received signal from the quantum circuit 12, a logical qubit is formed of two or more physical qubits 14 as understood by one of ordinary skill in the art. The various signals sent and corresponding signals received back can be performed using the scheme or code that follows/adheres to plaquettes, as understood by one of ordinary skill in the art.

Some examples of measurements are illustrated in FIGS. 5A, 5B, 5C, 5E, and 5F. FIG. 5A illustrates a vertical brick wall unit of a honeycomb lattice. FIG. 5B illustrates a vertical brick wall unit of the 4.8.8 lattice. FIG. 5C illustrates the directions for XX. YY, and ZZ measurements. FIG. 5D illustrates example bulk YY measurements. FIG. 5E illustrates example bulk XX measurements. FIG. 5F illustrates example bulk ZZ measurements. Colors are represented in FIGS. 5A, 5B, 5C. 5D, 5E, and 5F. The colors refer to the measurement time steps, rather than the Pauli operators. It is noted that the different colors describe the 3-coloring of the plaquettes and corresponding checks. The honeycomb and 4.8.8 lattices map to the tetron array of tetrons 410 of the quantum circuit 12 in FIG. 4 using vertical bricks such that each 2n-gon corresponds to a rectangle of height n. With this mapping, the honeycomb and 4.8.8 Floquet codes in the bulk use a subset of the highest fidelity two-qubit measurements: XX and YY measurements between vertically adjacent qubit islands in FIGS. 5E and 5D respectively, and ZZ between horizontally adjacent qubit islands in FIG. 5F. To implement measurements on neighboring pairs of vertically adjacent qubits without their corresponding loops intersecting, the two columns of semiconductor segments 420 separating each column of qubit islands 404, which are the qubits 14, can be utilized.

Figure 6B:
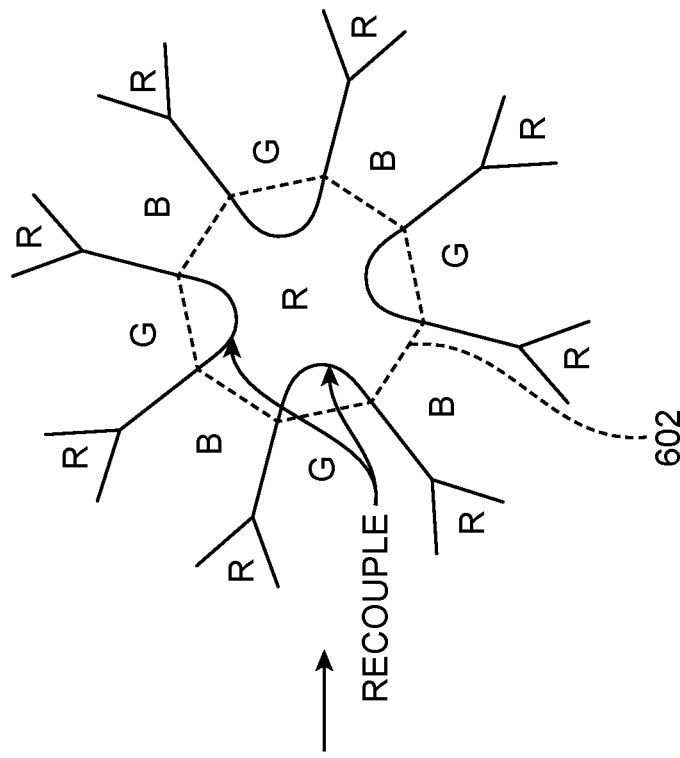
FIG. 6B depicts the plaquette 3-colorable lattice of the 4.8.8 code after recoupling to remove the dead qubit in accordance with one or more embodiments.
Figure 6A:
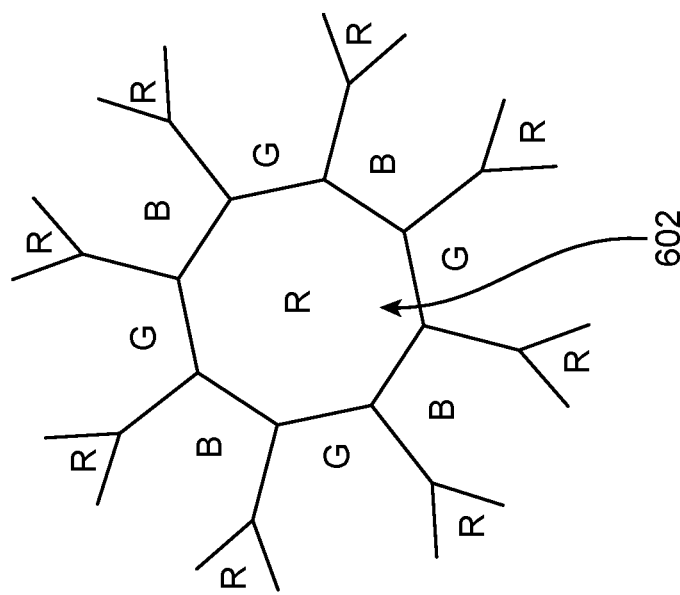
FIG. 6A depicts a plaquette 3-colorable lattice of the 4.8.8 code with a dead qubit in accordance with one or more embodiments.

To address dead qubits in a quantum circuit, one or more embodiments provide an example solution which is to recouple the lattice in the vicinity of the dead qubit to create another plaquette 3-colorable lattice that the controller 18A can run the Hastings-Haah code on while excluding use of the dead qubit. Although the Hastings-Haah code is an example quantum error correcting code, it should be appreciated that the disclosure can be applied to any quantum error correcting code that runs on a plaquette 3-colorable lattice in order to exclude or address dead qubits. Using the color code and Hastings-Haah code as examples, the Hastings-Haah code can be run as plaquettes having three colors that denote their measurement in the quantum circuit. As depicted in FIGS. 6A and 6B, a plaquette 3-colorable lattice is a trivalent lattice where each plaquette can be colored one of three colors such that no two adjacent plaquettes have the same color. In the example of FIGS. 6A and 6B, the three colors are red denoted by "R", green denoted by "G", and blue denoted by "B". A code, included in the instructions 24A, running on this lattice in FIG. 6A can take various forms. For example, for the Hastings-Haah code on these lattices, qubits live on the vertices, and one can perform all single qubit measurements in the quantum circuit 12; each link, as a superconducting wire 402, corresponds to a pairwise measurement between the qubits connected by the superconducting wire 402 as determined by the color of the link. It is noted that the plaquette 3-colorable lattice can be overlaid and executed on the quantum circuit 12. In accordance with one or more embodiments, the primitive operation is to remove a full plaquette and all the qubits that live at the boundary of the plaquette, in order to thereby remove a dead qubit. As illustrated in FIG. 6A, an example plaquette 602 is to be removed because the plaquette 602 has a dead qubit at its vertex. The removal of a plaquette, such as the removal of the plaquette 602 illustrated by dashed lines in FIG. 6B, can be done on any plaquette in a plaquette three colorable lattice, and the lattice remains plaquette three colorable after removing the plaquette 602. The dangling edges of the other plaquettes touching the removed plaquette 602 are recoupled without including the qubits of the removed plaquette. Although a plaquette with eight edges and eight vertices is shown as the plaquette 602, for example an octagon plaquette, any type of plaquette in a 3-colorable plaquette lattice can be removed. In the case where there are multiple dead qubits, then the strategy is to apply the construction iteratively until one has removed a minimal number of working qubits and all the dead qubits in the quantum circuit 12, according to one or more embodiments. Depending on the hardware realization, certain plaquettes can be more favorable to remove than others, as discussed below in the context of the 4.8.8 Hastings-Haah code.

Further details are provided below for removing a plaquette that has a dead qubit, thereby removing the dead qubit such that the neighboring plaquettes can be operated without support from the dead qubit. To remove a plaquette of color r, the software 111 of computer 100 is configured to first remove all edges and qubits at the boundary of the plaquette r, so that there is an even number of dangling edges of color r. For example, "r" may represent the color red in a plaquette 3-colorable lattice. The software 111 is configured to recouple those dangling edges by rerouting some of the connections. The dangling edges are from the other plaquettes that were previously connected to the removed plaquette r. There are two possible ways in which the software 111 can recouple the dangling edges to reroute the connections so as to exclude the desired plaquette r. As such, the software 111 can label the dangling edges $\{1, \ldots 2n\}$ where "n" is the last number of the dangling edges. The software 111 is configured to either recouple edge $2j-1$ to edge $2j$ or recouple edge $2j$ to edge $2j+1$, wherein "j" is chosen from $\{1, \ldots, n\}$ and the edge labelling is periodic modulo 2n, meaning that edge $2n+1$ is identified with edge 1. The resulting lattice is plaquette three colorable, and this operation is demonstrated in FIGS. 6A and 6B. From the topological perspective, this is a re-triangulation of the trivalent lattice on which the code is defined.

In FIGS. 6A and 6B, the primitive operation of the software 111 is shown for recoupling the lattice to remove dead qubits. The operation removes one entire plaquette and all the qubits at its boundary, in this case a red plaquette 602 is removed and all the qubits at its vertexes. The red edges terminating on the red plaquette 602 are recoupled, in this case, across the green plaquettes. The four blue plaquettes that were adjacent to the red plaquette are now merged into one large plaquette.

With this strategy, the software 111 is configured to optimize two parameters (1) to minimize the number of working qubits that are removed due to clusters of dead qubits so that the Hasting-Haah code is still working efficiently with the usable hardware, and (2) to minimize the number of edges at the boundary of the new plaquettes which are formed after the re-coupling. Detection cells, which are the neighboring plaquettes contiguous to the removed plaquette, have a fidelity that drops with the number of contributing measurements. A third consideration is that the software 111 is configured to recouple the lattice in a way that is amenable to the hardware layout. For example, if a re-coupling results in measurements that are not native to the original hardware or results in highly noisy measurement outcomes, such re-coupling may yield a lower quality fix than desired.

To further demonstrate this strategy using the Hastings-Haah 4.8.8 code, FIGS. 7A and 7B illustrate a logical lattice layout 700 for recoupling in the 4.8.8 code according to one to more embodiments. In the logical lattice layout 700, the 4.8.8 code defines squares that are also referred to as fourgons and octagons codes. In this example, the red plaquettes (R) are illustrated as the fourgons, while the green (G) and blue plaquettes (B) are illustrated as the octagons. This analysis begins in the case where there is an isolated dead qubit 710, and one or more embodiments determine measurements to exclude the dead qubit 710. In other words, the dead qubit 710 is identified as one of the qubits 14 in the quantum circuit 12. In accordance with one or more embodiments, it is noted that an isolated dead qubit 710 is always in the support of two octagons and one fourgon in the logical lattice of 4.8.8 code. In FIG. 7A, the dead qubit 710 supports an octagon 704 as a green (G) plaquette and another octagon 706 as an adjacent blue (B) plaquette. Removing either of the two octagons 704 and 706 would result in removing seven working qubits in addition to the dead qubit, because an octagon is a plaquette having a total of eight edges and eight vertexes resulting in eight qubits. In contrast, removing the fourgon 702, denoted as a red (R) plaquette, is more favorable because removal of the fourgon 702 results in removing only three working qubits 730 in addition to one dead qubit 710, as discussed in FIGS. 7A and 7B. As noted herein, the qubits are at the vertices of the edges forming the plaquettes as fourgons and octagons. For the fourgon 702, there are three physical qubits 14, which are the three operational qubits 730 in the logical lattice layout 700, in the quantum circuit 12 in addition to the dead qubits 710. The price that is paid by removing the fourgon 702 is that the software 111 (or Hasting-Haah code) has two new measurements 720 that need to be added to the measurement schedule, indicated as "new measurements" in FIG. 7B. The new measurements 720 are executed using the 4.8.8 code. In FIG. 7B, the two new measurements 720 are illustrated along two neighboring blue plaquettes, which then results in a super plaquette as the enlarged green plaquette. In one or more embodiments, the two new measurements could have been along two neighboring green plaquettes, which then results in a super plaquette as the enlarged blue plaquette.

A published paper of a layout of the 4.8.8 Hastings-Haah code using Majorana based architectures has been presented in by Adam Paetznick, Christina Knapp, Nicolas Delfosse, Bela Bauer, Jeongwan Haah, Matthew B. Hastings, and Marcus P. da Silva, in *Performance of planar floquet codes with majorana-based qubits*, PRX Quantum, 4:010310, Jan. 25, 2023, which is herein incorporated by reference.

The Hastings-Haah code is implemented in the instructions 24A in the quantum computer 10. In one or more embodiments, the Hastings-Haah code can be implemented as computer-executable instructions in the classical computer 100 and sent to the quantum computer 10 for execution. The 4.8.8 Hastings-Haah code uses "4.8.8" to refer to a lattice, where a portion of this lattice has been depicted in FIG. 7A. As understood by one of ordinary skill in the art, "Hastings-Haah code" denotes a technique of operating the 2D array of qubits 14 in the quantum circuit 12. Moreover, the Hastings-Haah code is a sequence of two qubit measurements on the quantum circuit 12 of the quantum computer 10, and the classical computer 100 eventually stores those measurement outcomes. That sequence of two qubit measurements is programmed into the classical computer 100, which then sends signals to the quantum computer 10, indicating which operations to perform on the quantum circuit 12.

The Hastings-Haah code can be run on any plaquette 3-colorable lattice with qubits residing at the vertices of the lattice. In FIGS. 6A and 7A, labeled are all the plaquettes with one of three letters "R" (red), "G" (green), and "B" (blue). A lattice is plaquette 3-colorable if there exists such a label so that no two adjacent plaquettes have the same label. The 4.8.8 lattice is a particular example of a plaquette 3-colorable lattice, as shown in FIG. 7A. This plaquette three coloring induces an edge three coloring. Although not shown for conciseness, edges that connect "R" plaquettes are labeled as "R" edges, edges that connect "G" plaquettes are labeled as "G" edges, and edges that connect "B" plaquettes are labeled "B" edges. This edge coloring determines the measurement operations. A note is that if there is a boundary in the system, then some of the measurements can be modified near the boundary as understood by one of ordinary skill in the art.

An example of the Hastings-Haah code is operated as follows on the quantum circuit 12 of the quantum computer 10. The classical computer 100 is configured to supply the following instruction set, for example, as part of the instructions 24A, to the quantum computer 10:

(1) For each "R" edge, measure Pauli XX on the pair of qubits residing at the two vertices at the boundary of that edge, and report the results to the classical computer 100. (2) For each "G" edge, measure Pauli YY on the pair of qubits residing at the two vertices at the boundary of that edge, report the results to the classical computer. (3) For each "B" edge, measure Pauli ZZ on the pair of qubits residing at the two vertices at the boundary of that edge, and report the results to the classical computer. (4) Repeat step (1). (5) Repeat step (3). (6) Repeat step (2). Now repeat steps 1-6.

Although discussion is directed to implementations of these measurements in Majorana-based codes, it is noted that the measurement operations can be modified to different hardware. Further, the measurement scheme implemented herein involves coupling and decoupling to nearby quantum dots, whose quantum capacitance shift is related to the measurement outcome. That signal is analyzed on the classical computer.

A published paper of a layout of the 4.8.8 Hastings-Haah code using Majorana based architectures has been presented in by Adam Paetznick, Christina Knapp, Nicolas Delfosse, Bela Bauer, Jeongwan Haah, Matthew B. Hastings, and Marcus P. da Silva, in *Performance of planar floquet codes with majorana-based qubits*, PRX Quantum, 4:010310, Jan. 25, 2023, which is herein incorporated by reference.

Figure 8:
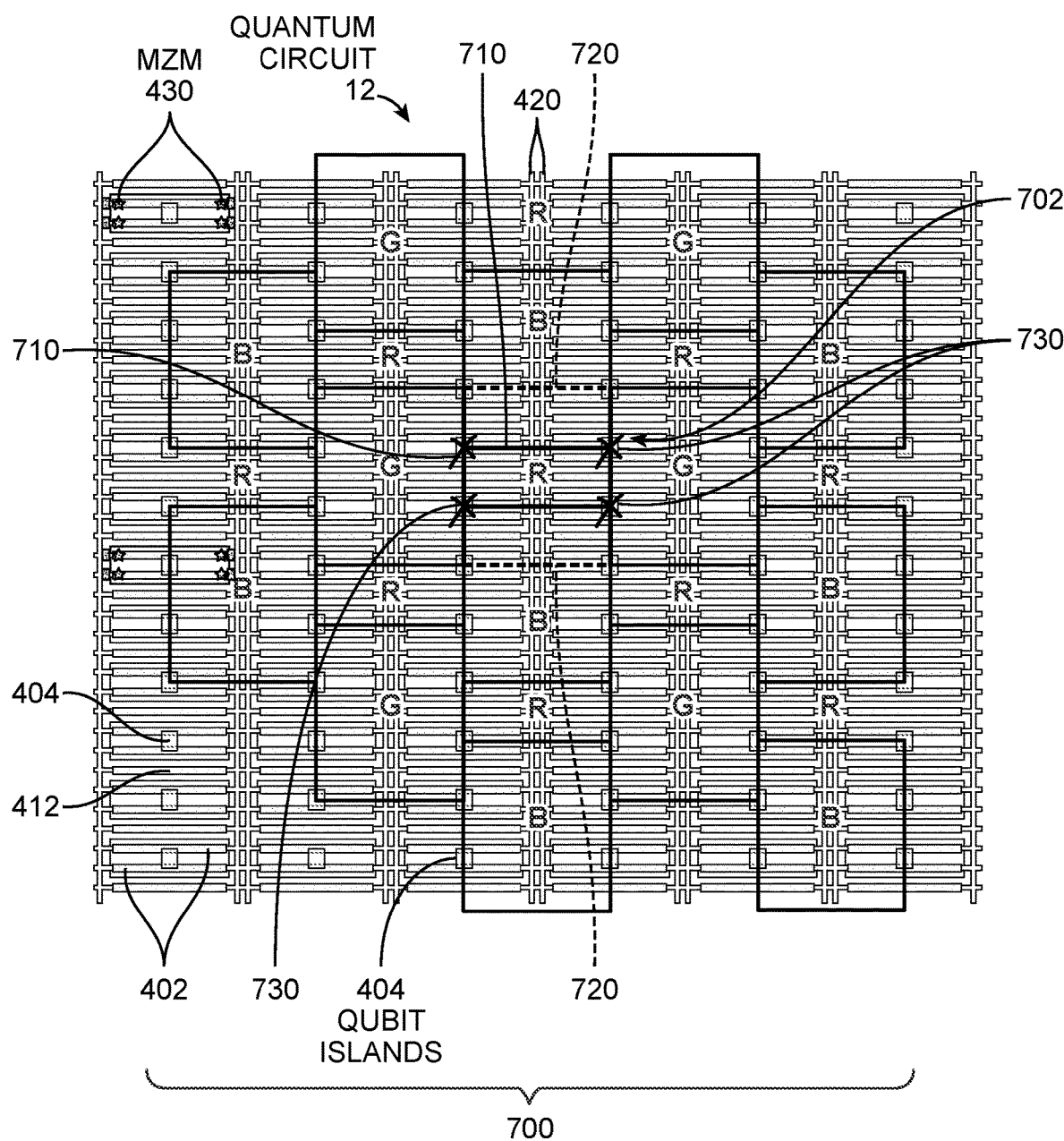
FIG. 8 depicts a layout of the 4.8.8 Hastings-Haah code on the quantum circuit in accordance with one or more embodiments.

FIG. 8 illustrates the layout of the 4.8.8 code in the presence of a dead qubit in accordance with one or more embodiments. In FIG. 8, the logical lattice layout 700 is overlayed on the square lattice of tetrons in the quantum circuit 12, in order to provide fault tolerant Hastings-Haah codes in the presence of a dead qubit, according to one or more embodiments. It is noted that the 4.8.8 lattice in FIGS. 7A and 7B can be rotated to fit on the quantum circuit 12. The qubits in the 4.8.8 lattice in FIGS. 7A and 7B correspond to the qubit islands 404 in FIG. 4, which are the physical qubits 14. The "B" plaquettes and "G" plaquettes are octagons having eight edges and eight vertices. The "R" plaquette is a fourgon having four edges and four vertices. Accordingly, the octagons are supported by eights qubits 14, represented as qubit islands 404 in FIG. 8, while the fourgons are supported by four qubits 14, represented as qubit islands 404 in FIG. 8.

As seen in the 4.8.8 code in FIG. 8, the removal of the fourgon 702 results in the two new measurements 720 depicted with dashed lines. In the layout, the new measurements 720 use two coherent links 412 and two semiconducting segments 420 in FIG. 4. This is in contrast to the original measurements, which involved 0, 4 and 6 semiconducting segments 420 and no coherent links 412. One can do a similar analysis with the Hastings-Haah Honeycomb code. Removing a plaquette in the Hastings-Haah honeycomb code with the current layout can either result in the use of a length 12 semiconductor measurement, or a length of 8 semiconductor plus (+) length 2 coherent links in a measurement, although using the 4.8.8 code may be more efficient.

FIG. 9 is a flowchart of a method 900 for removing a faulty qubit in a quantum circuit in accordance with one or more embodiments. Accordingly, FIG. 9 provides fault tolerant Hastings-Haah code in the presence of a dead qubit. The method 900 can be executed on the classical computer 100 coupled to the quantum computer 10 in order to generate and receive measured outcomes from the qubits 14 of the quantum circuit 12. Reference can be made to any of the figures discussed here.

At block 902, the software 111 executed on the computer 100 is configured to determine the faulty qubit 14 in the quantum circuit 12, the faulty qubit 14 being associated with a plaquette 702 having other qubits 14, where adjacent plaquettes are neighboring the plaquette. For example, FIGS. 7A, 7B, and 8 depict the faulty qubit 14 as qubit 710 for the plaquette 702, where adjacent plaquettes are blue (B) and green (G) that neighbor the plaquette 702 (e.g., red (R)).

At block 904, the software 111 executed on the computer 100 is configured to determine a route to isolate the plaquette 702 from the adjacent plaquettes. For example, FIGS. 7B and 8 illustrate a route that excludes connections or measurements for the plaquette 702. The route depicts an enlarged green (G) plaquette that excludes the plaquette 702, where the enlarged green (G) plaquette merges two plaquettes on opposite sides of the plaquette 702.

At block 906, the software 111 executed on the computer 100 is configured to cause measurements to be performed on the quantum circuit 12 for the route that isolates the plaquette 702 having the faulty qubit 14 and the other qubits 14. In FIGS. 7B and 8, the qubits 710 and 730 are removed from the route of measurements, thereby removing the plaquette 702. The measurements include new measurements 720 in order to exclude the plaquette 702.

According to one or more embodiments, the software 111 is configured to remove the faulty qubit 14 and the other qubits 14 of the plaquette 702 from the route such that the measurements exclude the plaquette 702. The route is structured to remove edges of the adjacent plaquettes from coupling to the plaquette 702 having the faulty qubit in order to isolate the plaquette 702. The measurements are performed on the quantum circuit 12 such that edges of the adjacent plaquettes are isolated from the plaquette 702 having the faulty qubit in order to isolate the plaquette. The route is structured to reconnect edges of the adjacent plaquettes without connecting to the plaquette 702.

In accordance with one or more embodiments, Hastings-Haah code is implemented to perform the measurements. For example, the Hastings-Haah code can be implemented in the software 111 of the classical computer 100. The plaquette and the adjacent plaquettes are formed in a 4.8.8 lattice. One color plaquette is a fourgon having four edges and four vertices, while the other two color plaquettes are octagons each having eight edges and eight vertices. The software 111 is configured to receiving measurement outcomes from the quantum circuit 12 in response to causing the measurements performed on the quantum circuit 12 for the route that isolates the plaquette 702 having the faulty qubit 14 and the other qubits 14.

One or more embodiments discuss decoupling with monomer measurements. In accordance with one or more embodiments, a method is provided for measuring the local logical qubits. When the Hastings-Haah code is being run on a patch, such as the quantum circuit 12, one can use the classical computer 100 to take the bulk measurement sequence to be RGBRBG and then repeat the bulk measurement. Thus, it is convenient to have a measurement sequence that is commensurate with this pattern, when addressing a dead qubit. The following measurement sequence (only) requires native operations that are already present and utilized for introducing boundaries and doing lattice surgery. Accordingly, decoupling the dead qubit with monomer measurements can utilize standard techniques in utilizing Hastings-Haah code for quantum computation in accordance with one or more embodiments. Thus, decoupling the dead qubit with monomer measurements has the benefit that it provides a very minimal change in how to operate the hardware of the quantum circuit 12, as depicted in FIG. 10.

The following describes an example of how to remove a single plaquette, and removing additional plaquettes can be performed by iterating this procedure. One strategy is to remove the minimal number of operational qubits and all dead qubits by iteratively removing plaquettes. The procedure is different from that described above, because single qubit measurements are utilized in order to generate the appropriate super-plaquette operators rather than recoupling the lattice as previously discussed (in FIGS. 6A, 6B, 7A, 7B, and 8). A publication that also uses a boundary condition with single qubit measurements is by Craig Gidney, Michael Newman, and Matt McEwen, entitled *Benchmarking the planar honeycomb code*, Quantum, 6:813, 2022. The publication by Craig Gidney is specifically designed not to measure logical qubits. In contrast, one or more embodiments measure the local logical qubits in the neighborhood of the dead qubit. The one plaquette is removed so that there are "dangling" edges in the lattice, in which the dangling edges are all of the same type. These dangling edges become monomer (i.e., single qubit) measurements in the measurement schedule. For example, if a red plaquette is removed, the disclosure calls the resulting monomer measurements $r_m X$, indicating that the red monomers are measured in the X basis. The period six measurement schedule that heals the lattice is given by the following expression: . . . →{rXX, $r_m X$}→{gYY}→{bZZ}→{rXX, $r_m X$}→{bZZ}→{gYY}→ . . . .

Figure 10:
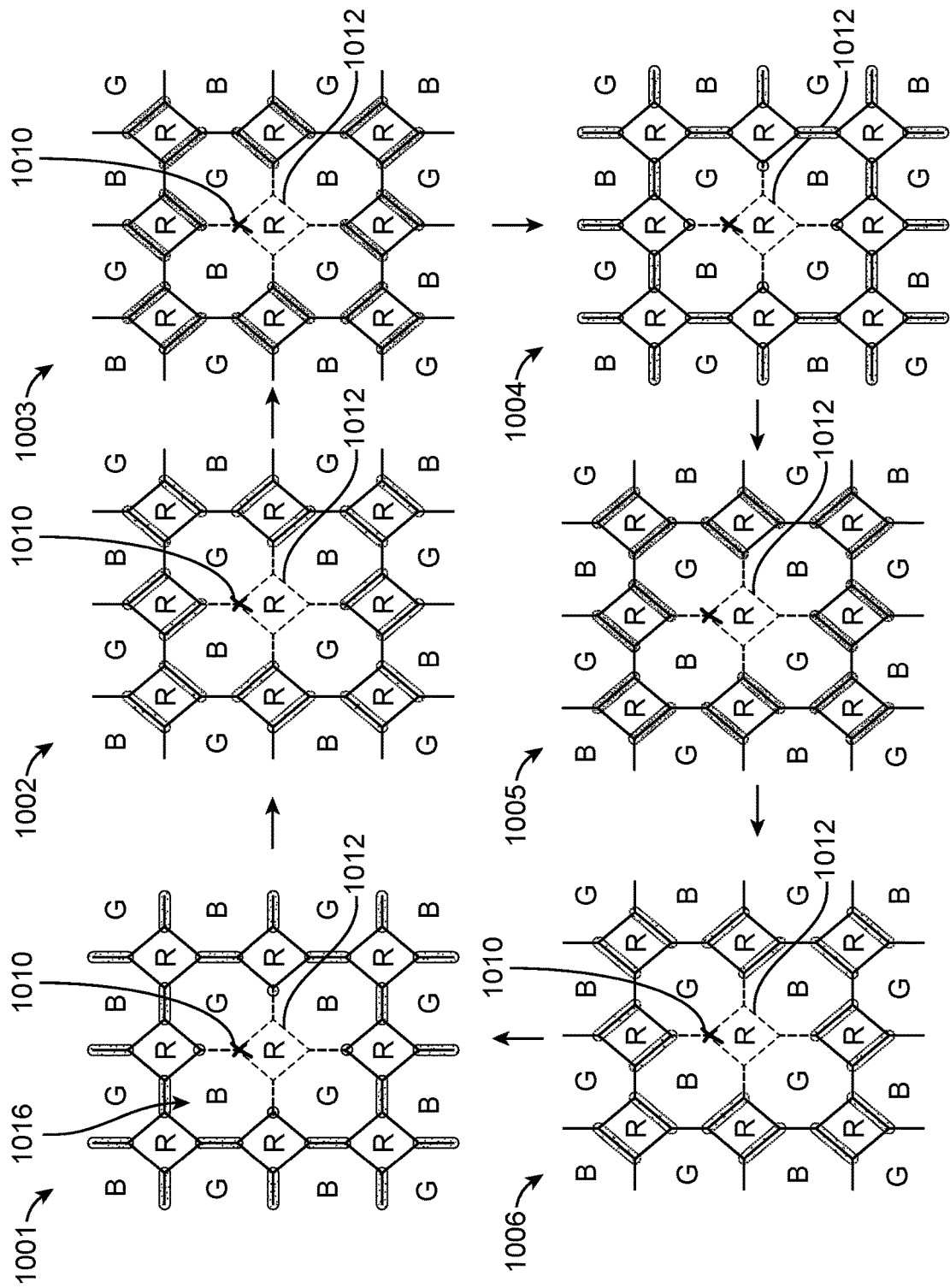
FIG. 10 depicts example measurement operations for the 4.8.8 Hastings-Haah code where a single square plaquette is removed, in accordance with one or more embodiments.

FIG. 10 depicts an example measurement operation for the 4.8.8 Hastings-Haah code where a single square plaquette is removed, thereby removing a dead qubit in the single square plaquette in accordance with one or more embodiments. As seen in FIG. 10, a sequence of measurement operations is shown to determine all superlattice plaquettes. FIG. 10 illustrates a logical lattice layout for 4.8.8 code according to one to more embodiments. In the logical lattice layout, the 4.8.8 code defines squares that are also referred to as fourgons and octagons codes. As noted above, the red plaquettes (R) are illustrated as the fourgons, while the green (G) and blue plaquettes (B) are illustrated as the octagons. This analysis begins in the case where there is dead qubit 1010. In other words, the dead qubit 1010 is identified as one of the qubits 14 in the quantum circuit 12. In accordance with one or more embodiments, it is noted that the dead qubit 1010 is always in the support of two octagons and one fourgon in the logical lattice for the 4.8.8 code. In FIG. 7A, the dead qubit 1010 supports an octagon 1014 as a green (G) plaquette and another octagon 1016 as an adjacent blue (B) plaquette. Additionally, the dead qubit 1010 supports the fourgon 1012 denoted as a red (R) plaquette, and the fourgon 1012 is being removed. As noted herein, the qubits are at the vertices of the edges forming the plaquettes as fourgons and octagons. FIG. 10 illustrates six measurement operations 1001, 1002, 1003, 1004, and 1006 utilized to isolate and remove the fourgon 1012. The highlighted edges and vertices are the dimer and monomer measurements respectively. The red edges are XX measurements, and the red dots are X measurements. The green edges are YY measurements, and the blue edges are ZZ measurements.

Figure 11:
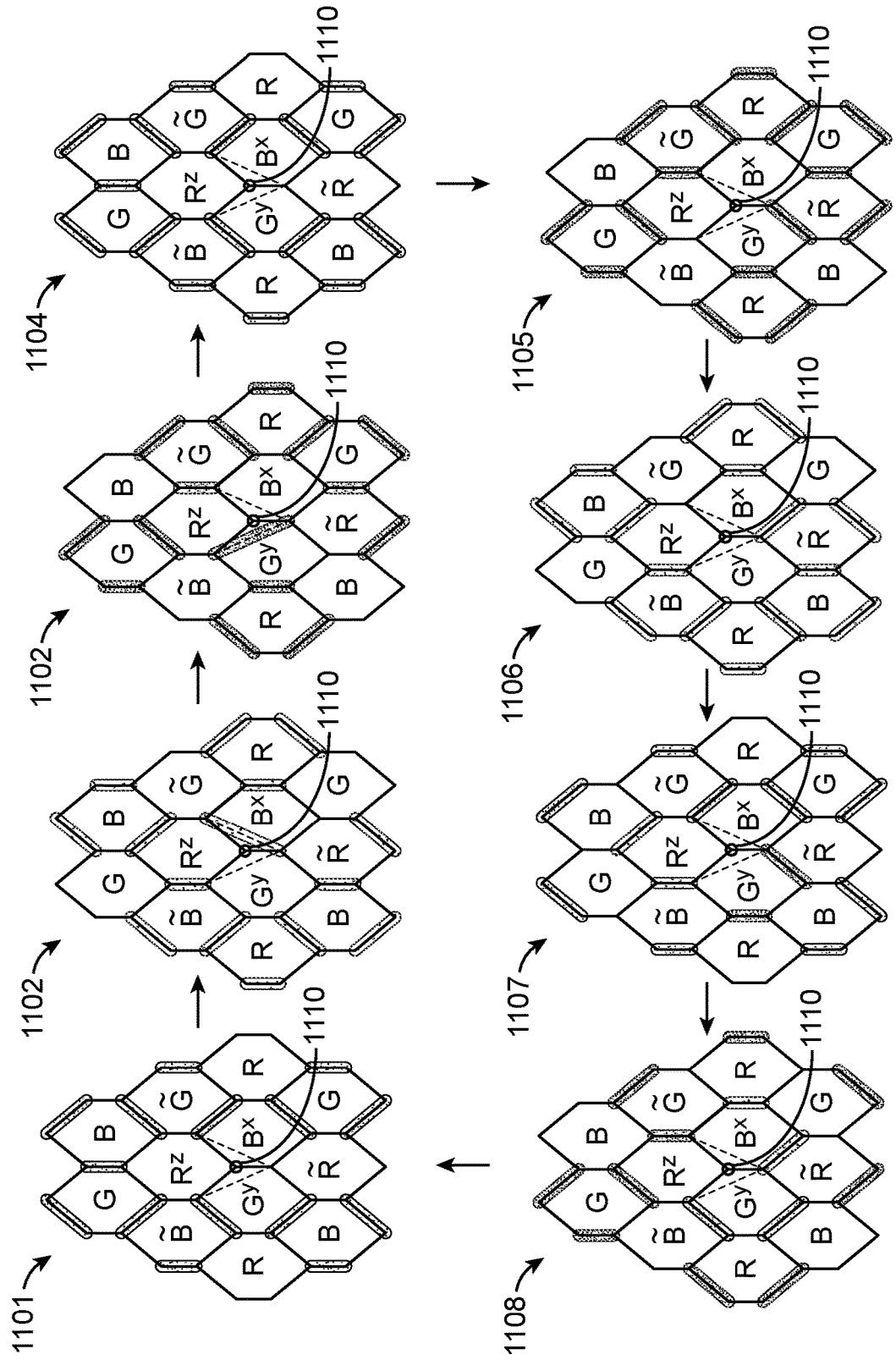
FIG. 11 depicts example measurement operations for the toric code to remove a dead qubit in accordance with one or more embodiments.

One or more embodiments disclose a triangle sequence similar to the lattice recoupling that results in removing active and usable qubits discussed above. In particularly, one or more embodiments provide a complimentary solution that makes use of all operational/useable qubits, while combining the recoupling approach and the monomer measurement approach above. This results in a deformation of the Hastings-Haah code with a modified measurement sequence near the dead qubit 1110 in FIG. 11. The triangle sequence approach (only) requires introducing two new measurements. In terms of the effective toric code, the broken or dead qubit 1110 acts like a missing edge. On the hexagon lattice, for example, the effective toric code has a 5 valent vertex term and a 4-sided plaquette term at the location of the missing edge at each measurement step. These defect vertex and plaquette terms rotate around the dead qubit 1110 from round-to-round during the eight measurement operations 1101, 1102, 1103, 1104, 1105, 1106, 1107, and 1108 in FIG. 11, where the software 111 on the computer 100 causes the measurements to be performed on the quantum circuit 12. The approach is to make a designer measurement schedule that reads out the value of the resulting effective toric code stabilizers once per measurement period. A period includes all the eight measurement operations 1101, 1102, 1103, 1104, 1105, 1106, 1107, and 1108. In FIG. 11, the sequence of eight measurement operations/steps 1101-1108 infers all stabilizers once per eight measurement steps. Stabilizers far from the defect are running the usual honeycomb code according to →R→G→B→R→B→G→R→B→ . . . . Near the dead qubit 1110, the software 111 modifies the measurements to include two "new measurements" in measurement operations 1102 and 1103, one monomer measurement in measurement operations 1101 and 1104, and a deformation of the R, G, B measurements in the last two measurement operations 1107 and 1108.

The modified measurement sequence in FIG. 11 has a small price to pay. For example, some of the detection cells that have support near the dead qubit 1110 have a longer measurement period and have many measurements contributing to the detection cell. It is noted that the measurement sequence of measurement operations 1101-1108 could be modified so that the measurement sequence is commensurate with a bulk measurement sequence that may be utilized in practice to accommodate boundary conditions.

Figure 12A:
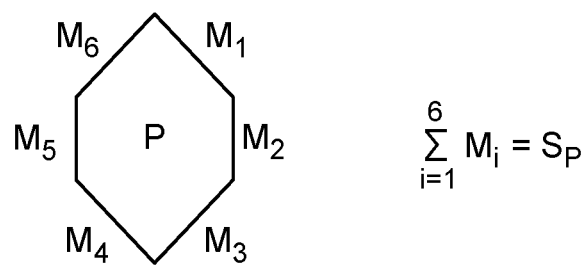
FIG. 12A depicts an example illustrating that the sum of the measurements around a plaquette are constant in accordance with one or more embodiments.
Figure 12B:
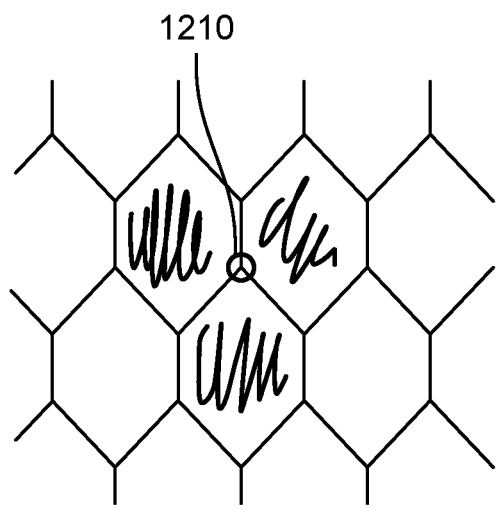
FIG. 12B depicts an example illustrating the use of three adjacent plaquettes to triangulate a dead qubit in accordance with one or more embodiments.
Figure 12C:
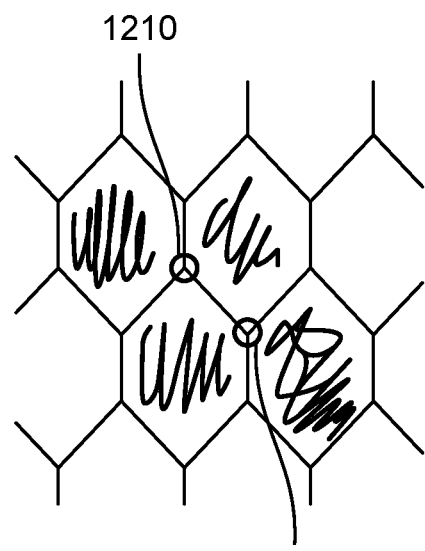
FIG. 12C depicts an example illustrating the use of four adjacent plaquettes to triangulate a pair of dead qubits in accordance with one or more embodiments.

Now turning detecting a dead qubit 14 in the quantum circuit 12, FIGS. 12A, 12B, and 12C are presented to illustrate an example method in accordance with one or more embodiments. The software 111 is configured to initially run the Hastings-Haah code as if there are no dead qubits. The measurements are associated to edges of a plaquette. The sum of the measurement outcomes around a plaquette are highly correlated. In the absence of errors, the sum mod 2 is a constant for a plaquette. FIG. 12A illustrates that the sum of the measurements M1, M2, M3, M4, M5, and M6 around a plaquette p should be constant, where M1+M2+M3+M3+M4+M5+M6=$S_p$, where $S_p$ is the sum of the measurements around the plaquette p.

Errors will change this value of $S_p$ occasionally. If the qubits (e.g., six qubits at the vertices) are functioning in a low error rate regime, the sum mod 2 will change rarely. If the mod 2 value of the sum of those measurements sum is random (or flipping too frequently), the software 111 is configured to determine that this means that one of the qubits in the support of that plaquette is dead. For example, the software 111 is configured to check and determine that the measurements for that the sum of the measurements around the plaquette p is not constant, and the software 111 determines that the plaquette is supported by a dead qubit at its vertex. Knowing which plaquettes have random values, the software 111 is configured to triangulate a dead qubit as shown in the FIGS. 12B and 12C. For example, adjacent plaquettes can each have a sum that is not constant. In FIG. 12B, three adjacent plaquettes triangulate a dead qubit 1210 (depicted as dot). For example, the software 111 is configured to determine that three neighboring plaquettes each have random values for the sum of their respective measurements around each plaquette, and then the software 111 determines that there is a dead qubit at a common vertex of each of the three neighboring plaquettes, thereby triangulating the location of the dead qubit. In FIG. 12C, four adjacent plaquettes triangulate a pair of dead qubits 1210 and 1212 (two dots). FIG. 12 shows that the triangulation process can be continued to determine that there is another dead qubit, using four adjacent plaquettes where three of the four plaquettes share one dead qubit and another combination of three of the four plaquettes share another dead qubit.

Figure 13:
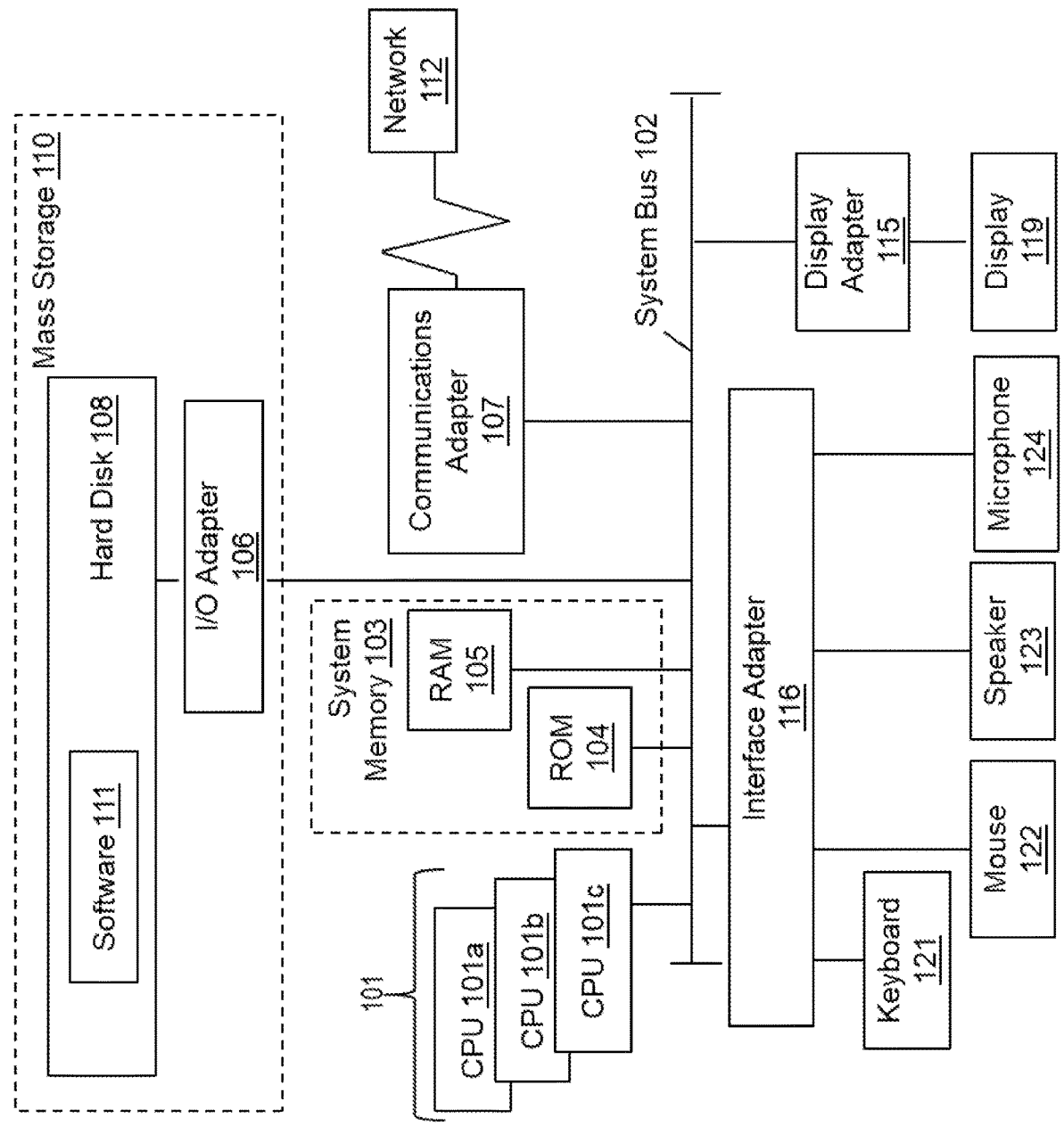
FIG. 13 depicts a block diagram of a classical computer system according to one or more embodiments.

Turning now to FIG. 13, a computer system 100 is generally shown in accordance with one or more embodiments of the invention. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 13 the computer system 100 has one or more central processing units (CPU(s)) 101a, 101b, 101c, etc., (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS) or its successors like Unified Extensible Firmware Interface (UEFI), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system to coordinate the functions of the various components shown in FIG. 13.

Additional input/output devices are shown as connected to the system bus 102 via a display adapter 115 and an interface adapter 116. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by the display adapter 115, which may include a graphics controller to improve the performance of graphics intensive applications and a video controller. A keyboard 121, a mouse 122, a speaker 123, a microphone 124, etc., can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 13, the computer system 100 includes processing capability in the form of the processors 101, storage capability including the system memory 103 and the mass storage 110, input means such as the keyboard 121, the mouse 122, and the microphone 124, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 13 is not intended to indicate that the computer system 100 is to include all of the components shown in FIG. 13. Rather, the computer system 100 can include any appropriate fewer or additional components not illustrated in FIG. 13 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

While the disclosure has been described with reference to various embodiments, it will be understood by those skilled in the art that changes may be made and equivalents may be substituted for elements thereof without departing from its scope. The various tasks and process steps described herein can be incorporated into a more comprehensive procedure or process having additional steps or functionality not described in detail herein. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

Unless defined otherwise, technical and scientific terms used herein have the same meaning as is commonly understood by one of skill in the art to which this disclosure belongs.

Various embodiments of the invention are described herein with reference to the related drawings. The drawings depicted herein are illustrative. There can be many variations to the diagrams and/or the steps (or operations) described therein without departing from the spirit of the disclosure. For instance, the actions can be performed in a differing order or actions can be added, deleted or modified. All of these variations are considered a part of the present disclosure.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. The term "or" means "and/or" unless clearly indicated otherwise by context.

The terms "received from", "receiving from", "passed to", "passing to", etc. describe a communication path between two elements and does not imply a direct connection between the elements with no intervening elements/connections therebetween unless specified. A respective communication path can be a direct or indirect communication path.

The corresponding structures, materials, acts, and equivalents of all means or step plus function elements in the claims below are intended to include any structure, material, or act for performing the function in combination with other claimed elements as specifically claimed.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The present invention may be a system, a method, and/or a computer program product at any possible technical detail level of integration. The computer program product may include a computer readable storage medium (or media) having computer readable program instructions thereon for causing a processor to carry out aspects of the present invention.

Various embodiments are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments described herein have been presented for purposes of illustration, but are not intended to be exhaustive or limited to the form(s) disclosed. The embodiments were chosen and described in order to best explain the principles of the disclosure. Many modifications and variations will be apparent to those of ordinary skill in the art without departing from the scope and spirit of the described embodiments. The terminology used herein was chosen to best explain the principles of the various embodiments, the practical application or technical improvement over technologies found in the marketplace, or to enable others of ordinary skill in the art to understand the embodiments described herein.

What is claimed is:

1. A method for removing a faulty qubit in a quantum circuit, the method comprising:
    determining the faulty qubit in the quantum circuit, the faulty qubit being associated with a plaquette having other qubits, wherein adjacent plaquettes are neighboring the plaquette;
    determining a route to isolate the plaquette from the adjacent plaquettes; and
    causing measurements to be performed on the quantum circuit for the route that isolates the plaquette having the faulty qubit and the other qubits.

2. The method of claim 1, further comprising removing the faulty qubit and the other qubits of the plaquette from the route such that the measurements exclude the plaquette.

3. The method of claim 1, wherein the route is structured to remove edges of the adjacent plaquettes from coupling to the plaquette having the faulty qubit in order to isolate the plaquette.

4. The method of claim 1, wherein the measurements are performed on the quantum circuit such that edges of the adjacent plaquettes are isolated from the plaquette having the faulty qubit in order to isolate the plaquette.

5. The method of claim 1, wherein the route is structured to reconnect edges of the adjacent plaquettes without connecting to the plaquette.

6. The method of claim 1, wherein Hastings-Haah code is implemented to perform the measurements.

7. The method of claim 1, wherein the plaquette and the adjacent plaquettes are formed in a 4.8.8 lattice.

8. The method of claim 1, further comprising receiving measurement outcomes from the quantum circuit in response to causing the measurements performed on the quantum circuit for the route that isolates the plaquette having the faulty qubit and the other qubits.

9. A system having a memory, computer readable instructions, and a processor for executing the computer readable instructions, the computer readable instructions controlling the processor to perform operations comprising:
    determining a faulty qubit in a quantum circuit, the faulty qubit being associated with a plaquette having other qubits, wherein adjacent plaquettes are neighboring the plaquette;
    determining a route to isolate the plaquette from the adjacent plaquettes; and
    causing measurements to be performed on the quantum circuit for the route that isolates the plaquette having the faulty qubit and the other qubits.

10. The system of claim 9, wherein the processor is controlled to perform the operations further comprising removing the faulty qubit and the other qubits of the plaquette from the route such that the measurements exclude the plaquette.

11. The system of claim 9, wherein the route is structured to remove edges of the adjacent plaquettes from coupling to the plaquette having the faulty qubit in order to isolate the plaquette.

12. The system of claim 9, wherein the measurements are performed on the quantum circuit such that edges of the adjacent plaquettes are isolated from the plaquette having the faulty qubit in order to isolate the plaquette.

13. The system of claim 9, wherein the route is structured to reconnect edges of the adjacent plaquettes without connecting to the plaquette.

14. The system of claim 9, wherein Hastings-Haah code is implemented to perform the measurements.

15. The system of claim 9, wherein the plaquette and the adjacent plaquettes are formed in a 4.8.8 lattice.

16. The system of claim 9, wherein the processor is controlled to perform the operations further comprising receiving measurement outcomes from the quantum circuit in response to causing the measurements performed on the quantum circuit for the route that isolates the plaquette having the faulty qubit and the other qubits.

17. A system comprising:
    a quantum circuit;
    a computer coupled to the quantum circuit and comprising a processor controlled to perform operations comprising:

determining a faulty qubit in the quantum circuit, the faulty qubit being associated with a plaquette having other qubits, wherein adjacent plaquettes are neighboring the plaquette;

determining a route to isolate the plaquette from the adjacent plaquettes; and causing measurements to be performed on the quantum circuit for the route that isolates the plaquette having the faulty qubit and the other qubits.

18. The system of claim 17, wherein the processor is controlled to perform the operations further comprising removing the faulty qubit and the other qubits of the plaquette from the route such that the measurements exclude the plaquette.

19. The system of claim 17, wherein the route is structured to remove edges of the adjacent plaquettes from coupling to the plaquette having the faulty qubit in order to isolate the plaquette.

20. The system of claim 17, wherein the measurements are performed on the quantum circuit such that edges of the adjacent plaquettes are isolated from the plaquette having the faulty qubit in order to isolate the plaquette.

* * * * *